(12) United States Patent
Villarreal-Saucedo et al.

(10) Patent No.: US 11,698,482 B2
(45) Date of Patent: Jul. 11, 2023

(54) LASER SYSTEMS UTILIZING CELLULAR-CORE OPTICAL FIBERS FOR BEAM SHAPING

(71) Applicants: Francisco Villarreal-Saucedo, Middleton, MA (US); Wang-Long Zhou, Andover, MA (US); Parviz Tayebati, Sherborn, MA (US)

(72) Inventors: Francisco Villarreal-Saucedo, Middleton, MA (US); Wang-Long Zhou, Andover, MA (US); Parviz Tayebati, Sherborn, MA (US)

(73) Assignee: Panasonic Connect North America, Division of Panasonic Corporation of North America, Newark, NJ (US)

( * ) Notice: Subject to any disclaimer, the term of this patent is extended or adjusted under 35 U.S.C. 154(b) by 0 days.

(21) Appl. No.: 17/578,593

(22) Filed: Jan. 19, 2022

(65) Prior Publication Data

US 2022/0214495 A1    Jul. 7, 2022

Related U.S. Application Data

(63) Continuation of application No. 17/082,604, filed on Oct. 28, 2020, now Pat. No. 11,262,497, which is a
(Continued)

(51) Int. Cl.
| | | |
|---|---|---|
| *G02B 6/02* | (2006.01) | |
| *G02B 6/036* | (2006.01) | |
| *G02B 6/26* | (2006.01) | |
| *G02B 6/34* | (2006.01) | |
| *G02B 6/42* | (2006.01) | |

(Continued)

(52) U.S. Cl.
CPC ..... *G02B 6/02042* (2013.01); *G02B 6/03605* (2013.01); *G02B 6/262* (2013.01); *G02B 6/34* (2013.01); *G02B 6/4296* (2013.01); *G02B 6/32* (2013.01); *G02B 6/3512* (2013.01); *G02B 6/3524* (2013.01); *G02B 6/3598* (2013.01)

(58) Field of Classification Search
CPC .. G02B 6/02042; G02B 6/4296; G02B 6/262; G02B 6/34; G02B 6/03605; G02B 6/3598; G02B 6/3524; G02B 6/3512; G02B 6/32
See application file for complete search history.

(56) References Cited

U.S. PATENT DOCUMENTS

| | | |
|---|---|---|
| 10,088,632 B2 | 10/2018 | Zhou |
| 10,401,562 B2 | 9/2019 | Villarreal-Saucedo et al. |

(Continued)

FOREIGN PATENT DOCUMENTS

| | | |
|---|---|---|
| JP | 2004188457 A | 7/2004 |
| WO | 2016044149 A1 | 3/2016 |

OTHER PUBLICATIONS

International Search Report for International Application No. PCT/US2018/015128 dated May 8, 2018, 17 pages.

*Primary Examiner* — John Bedtelyon
(74) *Attorney, Agent, or Firm* — Morgan, Lewis & Bockius LLP

(57) ABSTRACT

In various embodiments, the beam parameter product and/or beam shape of a laser beam is adjusted by directing the laser beam across a path along the input end of a cellular-core optical fiber. The beam emitted at the output end of the cellular-core optical fiber may be utilized to process a workpiece.

28 Claims, 11 Drawing Sheets

Related U.S. Application Data continuation of application No. 16/522,893, filed on Jul. 26, 2019, now Pat. No. 10,852,471, which is a continuation of application No. 15/879,500, filed on Jan. 25, 2018, now Pat. No. 10,401,562.

(60) Provisional application No. 62/450,793, filed on Jan. 26, 2017.

(51) Int. Cl.
*G02B 6/32* (2006.01)
*G02B 6/35* (2006.01)

(56) References Cited

U.S. PATENT DOCUMENTS

| | | | |
|---|---|---|---|
| 10,852,471 B2 | 12/2020 | Villarreal-Saucedo et al. | |
| 2008/0173392 A1* | 7/2008 | Tanaka | B23K 26/0608 |
| | | | 156/380.9 |
| 2013/0218321 A1 | 8/2013 | Miyamoto et al. | |
| 2014/0308005 A1 | 10/2014 | Lee et al. | |
| 2015/0037818 A1 | 12/2015 | Tayebati et al. | |
| 2016/0006203 A1 | 3/2016 | Mori | |
| 2016/0116679 A1 | 4/2016 | Muendel et al. | |
| 2018/0210144 A1 | 7/2018 | Villarreal-Saucedo et al. | |
| 2020/0018894 A1 | 1/2020 | Villarreal-Saucedo et al. | |
| 2021/0013228 A1 | 5/2021 | Villarreal-Saucedo et al. | |

* cited by examiner

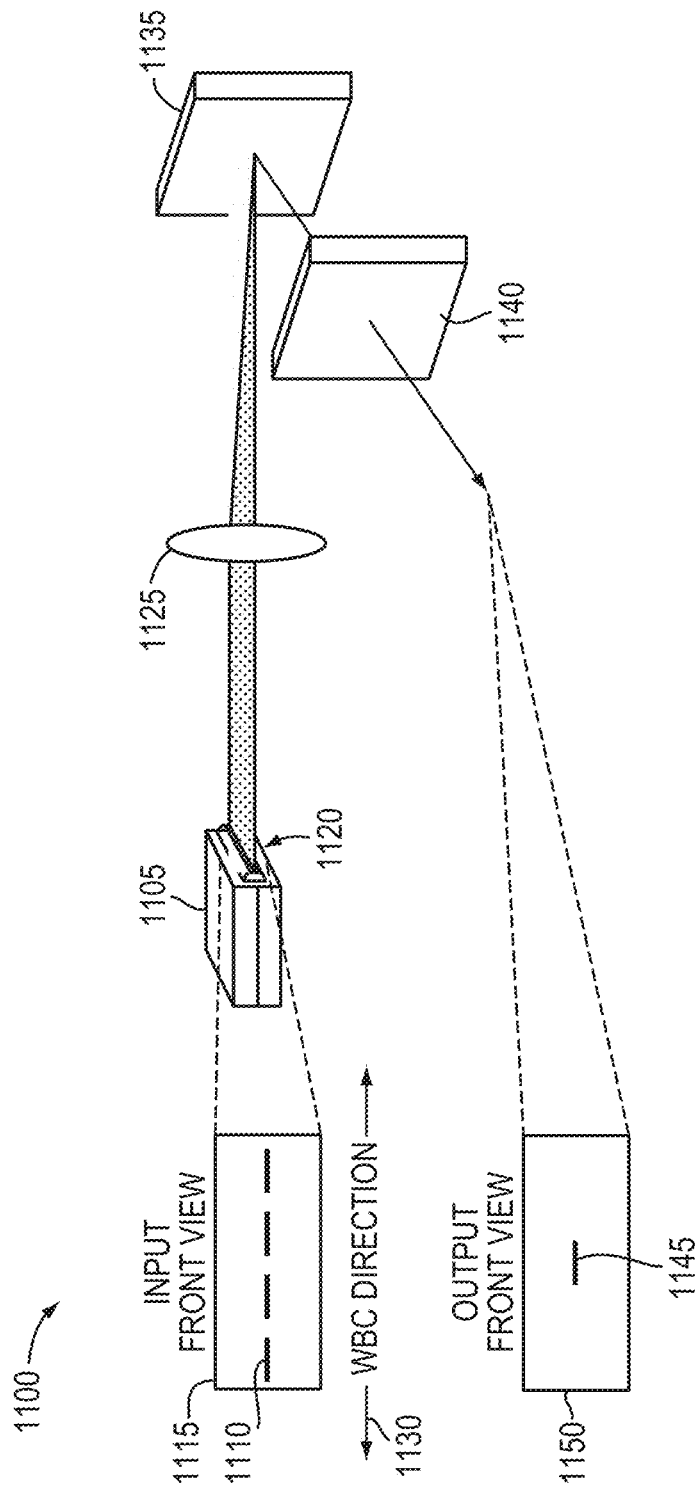

LASER SYSTEMS UTILIZING CELLULAR-CORE OPTICAL FIBERS FOR BEAM SHAPING

RELATED APPLICATIONS

This application is a continuation of U.S. patent application Ser. No. 17/082,604, filed Oct. 28, 2020, which is a continuation of U.S. patent application Ser. No. 16/522,893, filed Jul. 26, 2019, which is a continuation of U.S. patent application Ser. No. 15/879,500, filed Jan. 25, 2018, which claims the benefit of and priority to U.S. Provisional Patent Application No. 62/450,793, filed Jan. 26, 2017, the entire disclosure of each of which is hereby incorporated herein by reference.

TECHNICAL FIELD

In various embodiments, the present invention relates to laser systems, specifically laser systems with controllable beam profiles, e.g., variable beam shapes.

BACKGROUND

High-power laser systems are utilized for a host of different applications, such as welding, cutting, drilling, and materials processing. Such laser systems typically include a laser emitter, the laser light from which is coupled into an optical fiber (or simply a "fiber"), and an optical system that focuses the laser light from the fiber onto the workpiece to be processed. Wavelength beam combining (WBC) is a technique for scaling the output power and brightness from laser diodes, laser diode bars, stacks of diode bars, or other lasers arranged in a one- or two-dimensional array. WBC methods have been developed to combine beams along one or both dimensions of an array of emitters. Typical WBC systems include a plurality of emitters, such as one or more diode bars, that are combined using a dispersive element to form a multi-wavelength beam. Each emitter in the WBC system individually resonates, and is stabilized through wavelength-specific feedback from a common partially reflecting output coupler that is filtered by the dispersive element along a beam-combining dimension. Exemplary WBC systems are detailed in U.S. Pat. No. 6,192,062, filed on Feb. 4, 2000, U.S. Pat. No. 6,208,679, filed on Sep. 8, 1998, U.S. Pat. No. 8,670,180, filed on Aug. 25, 2011, and U.S. Pat. No. 8,559,107, filed on Mar. 7, 2011, the entire disclosure of each of which is incorporated by reference herein.

Optical systems for laser systems are typically engineered to produce the highest-quality laser beam, or, equivalently, the beam with the lowest beam parameter product (BPP). The BPP is the product of the laser beam's divergence angle (half-angle) and the radius of the beam at its narrowest point (i.e., the beam waist, the minimum spot size). That is, BPP=NA×D/2, where D is the focusing spot (the waist) diameter and NA is the numerical aperture; thus, the BPP may be varied by varying NA and/or D. The BPP quantifies the quality of the laser beam and how well it can be focused to a small spot, and is typically expressed in units of millimeter-milliradians (mm-mrad). A Gaussian beam has the lowest possible BPP, given by the wavelength of the laser light divided by pi. The ratio of the BPP of an actual beam to that of an ideal Gaussian beam at the same wavelength is denoted $M^2$, which is a wavelength-independent measure of beam quality.

In many laser-processing applications, the desired beam shape, spot size, divergence, and beam quality may vary depending on, for example, the type of processing and/or the type of material being processed. This is particularly true for industrial lasers in material processing applications. For example, a lower BPP value, i.e., a better beam quality, may be preferred for cutting a thin metal, while a larger BPP (i.e., a worse beam quality) may be preferred for cutting through thicker metals. In order to change the BPP or beam shape in conventional laser systems, frequently the output optical system must be swapped out with other components and/or realigned, a time-consuming and expensive process that may even lead to inadvertent damage of the fragile optical components of the laser system. Thus, there is a need for alternative techniques for varying the BPP and/or beam shape of a laser system that do not involve such adjustments to the laser beam or optical system at the output of the optical fiber.

SUMMARY

In accordance with embodiments of the present invention, laser systems produce beams that are directed into one or more core regions of a cellular-core optical fiber in order to alter the beam shape and/or BPP. (Such beams are the "input beams" with reference to the optical fiber and may be simply "beams" or "output beams" with reference to the laser system initially generating the beam.) In various embodiments, the optical fiber has an inter-core cladding that extends between and around the various core regions; in various embodiments, all or a portion of the beam may be directed into this inter-core region in order to alter the BPP of the ultimate output beam. The optical fiber may have one or more outer cladding layers that confine the beam energy in the core regions and/or the inter-core region.

The beam may be modulated such that it is only directed into various ones of the core regions without significant emission when the beam is moved between the core regions. In other embodiments, the beam is moved from core region to core region without modulation—i.e., variations in power level—therebetween (or with modulation to a different non-zero, finite power level, either higher or lower than the power level at which the beam is emitted into the core region(s)), and thus portions of the beam power may be coupled into the inter-core cladding region. In various embodiments, the beam may be modulated at different power levels when it is directed into different ones of the core regions such that different amounts of beam power are coupled into different core regions. Instead or in addition, the beam may be directed toward different ones of the core regions for different times such that the time-averaged power levels coupled into different core regions are different. The core regions themselves may have different cross-sectional shapes and/or sizes that determine, at least in part, the final shape of the beam emitted from the optical fiber. In other embodiments, one or more (or even all) of the core regions have substantially the same shape (e.g., circular) and/or size, and the final shape of the beam is determined, at least in part, by the translation of the beam among different ones of the core regions and/or the amount of beam power coupled into the different core regions and/or the amount of beam power coupled into the inter-core cladding region. In various embodiments, at least a portion of the beam power may be coupled into one or more of the outer cladding layers, at least for some amount of time, to alter the shape and/or BPP of the output beam.

As utilized herein, changing the "shape" of a laser beam refers to altering the shape and geometric extent of the beam (e.g., at a point at which the beam intersects a surface). Changes in shape may be accompanied by changes in beam size, angular intensity distribution of the beam, and BPP, but mere changes in beam BPP are not necessarily sufficient to change laser beam shape and vice versa.

Herein, "optical elements" may refer to any of lenses, mirrors, prisms, gratings, and the like, which redirect, reflect, bend, or in any other manner optically manipulate electromagnetic radiation. Herein, beam emitters, emitters, or laser emitters, or lasers include any electromagnetic beam-generating device such as semiconductor elements, which generate an electromagnetic beam, but may or may not be self-resonating. These also include fiber lasers, disk lasers, non-solid state lasers, etc. Generally, each emitter includes a back reflective surface, at least one optical gain medium, and a front reflective surface. The optical gain medium increases the gain of electromagnetic radiation that is not limited to any particular portion of the electromagnetic spectrum, but that may be visible, infrared, and/or ultraviolet light. An emitter may include or consist essentially of multiple beam emitters such as a diode bar configured to emit multiple beams. The input beams received in the embodiments herein may be single-wavelength or multi-wavelength beams combined using various techniques known in the art. In addition, references to "lasers," "laser emitters," or "beam emitters" herein include not only single-diode lasers, but also diode bars, laser arrays, diode bar arrays, and single or arrays of vertical cavity surface-emitting lasers (VCSELs).

Output beams produced in accordance with embodiments of the present invention may be utilized to process a workpiece such that the surface of the workpiece is physically altered and/or such that a feature is formed on or within the surface, in contrast with optical techniques that merely probe a surface with light (e.g., reflectivity measurements). Exemplary processes in accordance with embodiments of the invention include cutting, welding, drilling, and soldering. Various embodiments of the invention may also process workpieces at one or more spots or along a one-dimensional linear or curvilinear processing path, rather than flooding all or substantially all of the workpiece surface with radiation from the laser beam. Such one-dimensional paths may be composed of multiple segments, each of which may be linear or curvilinear.

One advantage of variable shape and/or BPP is improved laser application performance for different types of processing techniques or different types of materials being processed. Embodiments of the invention may also utilize various techniques for varying BPP and/or shape of laser beams described in U.S. patent application Ser. No. 14/632,283, filed on Feb. 26, 2015, U.S. patent application Ser. No. 14/747,073, filed Jun. 23, 2015, U.S. patent application Ser. No. 14/852,939, filed Sep. 14, 2015, U.S. patent application Ser. No. 15/188,076, filed Jun. 21, 2016, U.S. patent application Ser. No. 15/479,745, filed Apr. 5, 2017, and U.S. patent application Ser. No. 15/649,841, filed Jul. 14, 2017, the disclosure of each of which is incorporated in its entirety herein by reference.

Embodiments of the invention may be utilized with wavelength beam combining (WBC) systems that include a plurality of emitters, such as one or more diode bars, that are combined using a dispersive element to form a multi-wavelength beam. Each emitter in the WBC system individually resonates, and is stabilized through wavelength-specific feedback from a common partially reflecting output coupler that is filtered by the dispersive element along a beam-combining dimension. Exemplary WBC systems are detailed in U.S. Pat. No. 6,192,062, filed on Feb. 4, 2000, U.S. Pat. No. 6,208,679, filed on Sep. 8, 1998, U.S. Pat. No. 8,670,180, filed on Aug. 25, 2011, and U.S. Pat. No. 8,559,107, filed on Mar. 7, 2011, the entire disclosure of each of which is incorporated by reference herein. Multi-wavelength output beams of WBC systems may be utilized as input beams in conjunction with embodiments of the present invention for, e.g., BPP and/or beam shape control.

In an aspect, embodiments of the invention feature a laser system that includes, consists essentially of, or consists of a beam emitter for emission of an input laser beam, a cellular-core optical fiber, a reflector for receiving the input laser beam and reflecting the input laser beam toward the cellular-core optical fiber, an optical element, and a controller. The cellular-core optical fiber has an input end and an output end opposite the input end. The cellular-core optical fiber includes, consists essentially of, or consists of a plurality of core regions, and an inter-core cladding region surrounding and extending between the core regions. The cellular-core optical fiber may include an outer cladding surrounding the inter-core cladding region. The refractive index of at least one (or even each) of the core regions is larger than a refractive index of the inter-core cladding region. The optical element receives the input laser beam from the reflector and focuses the input laser beam toward (e.g., to strike) the input end of the cellular-core optical fiber. The controller controls relative motion between the input end of the cellular-core optical fiber and the reflector and/or the optical element to thereby direct the input laser beam along a path across the input end of the cellular-core optical fiber. The path may include, consist essentially of, or consist of one or more of the core regions. The path may include, consist essentially of, or consist of at least a portion of the inter-core cladding region. The path may include, consist essentially of, or consist of one or more of the core regions and at least a portion of the inter-core cladding region. A beam shape and/or a beam parameter product of an output beam emitted at the output end of the cellular-core optical fiber is determined at least in part by the path of the input laser beam.

Embodiments of the invention may include one or more of the following in any of a variety of combinations. The controller may be configured to direct the input laser beam along a path comprising a plurality of core regions. The controller may be configured to modulate the output power of the input laser beam as the input laser beam is directed along the path. For example, the output power level of the input laser beam may be different when the input laser beam is directed into different core regions and/or into the inter-core cladding region. The controller may be configured to reduce an output power of the input laser beam along portions of the path over (i.e., intersecting) the inter-core cladding region, thereby reducing or substantially eliminating coupling of beam energy into the inter-core cladding region. The path may include, consist essentially of, or consist of all or a portion of the inter-core cladding region. Beam energy coupled into the inter-core cladding region may contribute a non-zero background energy level to the output beam. The output beam may include, consist essentially of, or consist of a plurality of discrete beams at the output end of the cellular-core optical fiber. The plurality of discrete beams may merge into fewer beams (e.g., one beam) at a distance spaced away from the output end of the cellular-core optical fiber.

At least two of the core regions of the cellular-core optical fiber may differ in size and/or shape. The refractive index of the inter-core cladding region may be greater than or approximately equal to a refractive index of the outer cladding, if the outer cladding is present. The relative motion between the input end of the cellular-core optical fiber and the reflector and/or the optical element may include, consist essentially of, or consist of rotation of the reflector, rotation of the optical element, translation of the reflector, translation of the optical element, rotation of the input end of the cellular-core optical fiber, and/or translation of the input end of the cellular-core optical fiber. The optical element may include, consist essentially of, or consist of one or more lenses, one or more gratings (e.g., diffraction gratings), and/or one or more prisms. The system may include one or more actuators for controlling motion of the reflector, the optical element, and/or the input end of the cellular-core optical fiber. An input end cap may be disposed on the input end of the cellular-core optical fiber. An output end cap may be disposed on the output end of the cellular-core optical fiber.

The controller may be configured for feedback operation to progressively adjust the path along which the laser beam is directed on the input end of the cellular-core optical fiber based on a measured parameter. The measured parameter may be a measured parameter of a workpiece to be processed by the laser beam (e.g., composition, thickness, height or depth of a surface feature, reflectivity, etc.) and/or of the laser beam (e.g., the laser beam proximate the output end of the cellular-core optical fiber). The measured parameter of the laser beam may be, for example, flux density, beam shape, beam parameter product, beam diameter, beam intensity, beam intensity as a function of areal beam location, etc. At least two of the core regions of the cellular-core optical fiber may have different cross-sectional shapes. Each of the core regions of the cellular-core optical fiber may have the same cross-sectional shape (and two or more may have the same size or different sizes). The plurality of core regions of the cellular-core optical fiber may include, consist essentially of, or consist of (i) a central core region and (ii) a plurality of outer core regions disposed around the central core region. The diameter (or other parameter such as width, side length, etc.) of the central core region may be greater than that of at least one (or even all) of the outer core regions. The controller may be configured to increase the beam parameter product of the laser beam by directing the input laser beam along a path across the input end of the cellular-core optical fiber that intersects the inter-core cladding region.

The controller may be configured to determine the beam shape and/or the beam parameter product based at least in part on a characteristic of a workpiece proximate the output end of the optical fiber into which the laser beam is coupled. The characteristic of the workpiece may include, consist essentially of, or consist of a thickness of the workpiece, a composition of the workpiece, a reflectivity of the workpiece, and/or the height or depth of a surface feature on the workpiece. The system may include a memory, accessible to the controller, for storing data corresponding to a processing path defined on the workpiece. The processing path may include at least one directional change. The processing path may be composed of one or more linear segments and/or one or more curvilinear segments. The controller may be configured to alter the output power, beam shape, and/or beam parameter product of the beam along the processing path. The memory may be at least in part resident in the controller and/or at least in part resident remotely (e.g., network storage, cloud storage, etc.). The system may include a database for storing processing data for a plurality of materials. The controller may be configured to query the database to obtain processing data for one or more materials of the workpiece, and the beam shape and/or the beam parameter product of the beam may be determined at least in part by the obtained processing data.

The beam emitter may include, consist essentially of, or consist of one or more beam sources emitting a plurality of discrete beams, focusing optics for focusing the plurality of beams onto a dispersive element, a dispersive element for receiving and dispersing the received focused beams, and a partially reflective output coupler positioned to receive the dispersed beams, transmit a portion of the dispersed beams therethrough as the input laser beam, and reflect a second portion of the dispersed beams back toward the dispersive element. The input laser beam may be composed of multiple wavelengths. Each of the discrete beams may have a different wavelength. The second portion of the dispersed beams may propagate back to the one or more beam sources to thereby stabilize the beams to their emission wavelengths. The focusing optics may include or consist essentially of one or more cylindrical lenses, one or more spherical lenses, one or more spherical mirrors, and/or one or more cylindrical mirrors. The dispersive element may include, consist essentially of, or consist of one or more diffraction gratings (e.g., one or more transmissive gratings and/or one or more reflective gratings), one or more dispersive fibers, and/or one or more prisms.

The controller may be configured to receive a desired beam parameter of the output beam and determine the path across the input end of the cellular-core optical fiber based at least in part thereon. The desired beam parameter may include, consist essentially of, or consist of the beam parameter product and/or the beam shape of the output beam. The controller may be configured to determine the path across the input end of the cellular-core optical fiber based at least in part on a sensed (e.g., measured) beam parameter proximate the output end of the cellular-core optical fiber (e.g., at the output end, within a laser head attached to the output end, or on or near the surface of a workpiece to be processed).

In another aspect, embodiments of the invention feature a method of altering a beam shape and/or a beam parameter product of a laser beam. A cellular-core optical fiber is provided. The cellular-core optical fiber has an input end and an output end opposite the input end. The cellular-core optical fiber includes, consists essentially of, or consists of a plurality of core regions, and an inter-core cladding region surrounding and extending between the core regions. The cellular-core optical fiber may include an outer cladding surrounding the inter-core cladding region. The refractive index of at least one (or even each) of the core regions is larger than a refractive index of the inter-core cladding region. An input laser beam is directed across the input end of the cellular-core optical fiber along a path thereon. The path may include, consist essentially of, or consist of one or more of the core regions. The path may include, consist essentially of, or consist of at least a portion of the inter-core cladding region. The path may include, consist essentially of, or consist of one or more of the core regions and at least a portion of the inter-core cladding region. A beam shape and/or a beam parameter product of an output beam emitted at the output end of the cellular-core optical fiber is determined at least in part by the path of the input laser beam.

Embodiments of the invention may include one or more of the following in any of a variety of combinations. The path may include, consist essentially of, or consist of a plurality of core regions. The output power of the input laser beam may be modulated as the input laser beam is directed along the path. For example, the output power level of the input laser beam may be different when the input laser beam is directed into different core regions and/or into the inter-core cladding region. The output power of the input laser beam may be reduced (e.g., to zero or to near zero, or merely to a lower non-zero power) along portions of the path over (i.e., intersecting) the inter-core cladding region, thereby reducing or substantially eliminating coupling of beam energy into the inter-core cladding region. The path may include, consist essentially of, or consist of all or a portion of the inter-core cladding region. Beam energy coupled into the inter-core cladding region may contribute a non-zero background energy level to the output beam. The output beam may include, consist essentially of, or consist of a plurality of discrete beams at the output end of the cellular-core optical fiber. The plurality of discrete beams may merge into fewer beams (e.g., one beam) at a distance spaced away from the output end of the cellular-core optical fiber.

At least two of the core regions of the cellular-core optical fiber may differ in size and/or shape. The refractive index of the inter-core cladding region may be greater than or approximately equal to a refractive index of the outer cladding, if the outer cladding is present. An input end cap may be disposed on the input end of the cellular-core optical fiber. An output end cap may be disposed on the output end of the cellular-core optical fiber. A workpiece disposed proximate the output end of the cellular-core optical fiber may be processed with the output beam. The beam parameter product and/or the beam shape of the output laser beam may be determined, via selection of the path across the input end of the cellular-core optical fiber, based at least in part of a characteristic of the workpiece. The characteristic of the workpiece may include, consist essentially of, or consist of a thickness of the workpiece, a composition of the workpiece, a reflectivity of the workpiece, and/or the height or depth of a surface feature on the workpiece. The path across the input end of the cellular-core optical fiber may intersects the inter-core cladding region of the cellular-core optical fiber. Directing the input laser beam along the path may include, consist essentially of, or consist of (i) reflecting the laser beam with one or more reflectors and/or (ii) focusing the laser beam with one or more optical elements.

The input laser beam may be emitted from a beam emitter. The beam emitter may include, consist essentially of, or consist of one or more beam sources emitting a plurality of discrete beams, focusing optics for focusing the plurality of beams onto a dispersive element, a dispersive element for receiving and dispersing the received focused beams, and a partially reflective output coupler positioned to receive the dispersed beams, transmit a portion of the dispersed beams therethrough as the input laser beam, and reflect a second portion of the dispersed beams back toward the dispersive element. The input laser beam may be composed of multiple wavelengths. Each of the discrete beams may have a different wavelength. The second portion of the dispersed beams may propagate back to the one or more beam sources to thereby stabilize the beams to their emission wavelengths. The focusing optics may include or consist essentially of one or more cylindrical lenses, one or more spherical lenses, one or more spherical mirrors, and/or one or more cylindrical mirrors. The dispersive element may include, consist essentially of, or consist of one or more diffraction gratings (e.g., one or more transmissive gratings and/or one or more reflective gratings), one or more dispersive fibers, and/or one or more prisms.

A desired beam parameter of the output beam may be received, and the path across the input end of the cellular-core optical fiber may be selected based at least in part on the desired beam parameter. The desired beam parameter may include, consist essentially of, or consist of the beam parameter product and/or the beam shape of the output beam. The path across the input end of the cellular-core optical fiber may be selected based at least in part on a sensed (e.g., measured) beam parameter proximate the output end of the cellular-core optical fiber (e.g., at the output end, within a laser head attached to the output end, or on or near the surface of a workpiece to be processed).

In yet another aspect, embodiments of the invention feature a method of processing a workpiece with a laser beam. A cellular-core optical fiber is provided. The cellular-core optical fiber has an input end and an output end opposite the input end. The cellular-core optical fiber includes, consists essentially of, or consists of a plurality of core regions, and an inter-core cladding region surrounding and extending between the core regions. The cellular-core optical fiber may include an outer cladding surrounding the inter-core cladding region. The refractive index of at least one (or even each) of the core regions is larger than a refractive index of the inter-core cladding region. A workpiece is disposed or positioned proximate (e.g., optically downstream of) the output end of the cellular-core optical fiber. A beam parameter product and/or a beam shape for processing of the workpiece is determined based on at least one characteristic of the workpiece. A laser beam is directed toward (e.g., to strike) the input end of the cellular-core optical fiber. Thereafter and/or there during, the laser beam is directed along a path across the input end of the cellular-core optical fiber to select the beam parameter product and/or the beam shape of the laser beam emitted from the output end of the cellular-core optical fiber. The path may include, consist essentially of, or consist of one or more of the core regions. The path may include, consist essentially of, or consist of at least a portion of the inter-core cladding region. The path may include, consist essentially of, or consist of one or more of the core regions and at least a portion of the inter-core cladding region. The workpiece is processed with the laser beam emitted from the output end of the cellular-core optical fiber.

Embodiments of the invention may include one or more of the following in any of a variety of combinations. Processing the workpiece may include, consist essentially of, or consist of physically altering at least a portion of and/or forming a feature on and/or in a surface of the workpiece. Processing the workpiece may include, consist essentially of, or consist of cutting, welding, etching, annealing, drilling, soldering, and/or brazing. The at least one characteristic of the workpiece may include, consist essentially of, or consist of a thickness of the workpiece and/or a composition of the workpiece and/or a reflectivity of the workpiece. The path across the input end of the cellular-core optical fiber may intersect the inter-core cladding region of the cellular-core optical fiber, and beam energy coupled into the cellular-core cladding region may be utilized (at least in part) to process the workpiece. Directing the laser beam along the path across the input end of the cellular-core optical fiber may include, consist essentially of, or consist of (i) reflecting the laser beam with one or more reflectors and/or (ii) focusing the laser beam with one or more optical elements. The beam parameter product and/or the beam shape of the laser beam may be altered while and/or after processing the workpiece by directing the laser beam onto a second path across the input end of the cellular-core optical fiber, the second path being different from the path across the input end of the cellular-core optical fiber. The second path may include, consist essentially of, or consist of one or more of the core regions. The second path may include, consist essentially of, or consist of at least a portion of the inter-core cladding region. The second path may include, consist essentially of, or consist of one or more of the core regions and at least a portion of the inter-core cladding region. The second path may include, consist essentially of, or consist of the same core region(s) and/or inter-core cladding region (or portion thereof) as the path, and the time the beam spends intersecting one or more of the core regions and/or the inter-core cladding region may be different in the second path. A second workpiece different from the first workpiece may be processed while the beam is being directed along the second path. The second workpiece may have at least one characteristic (e.g., thickness, composition, reflectivity, etc.) different from that of the workpiece.

The input laser beam may be emitted from a beam emitter. The beam emitter may include, consist essentially of, or consist of one or more beam sources emitting a plurality of discrete beams, focusing optics for focusing the plurality of beams onto a dispersive element, a dispersive element for receiving and dispersing the received focused beams, and a partially reflective output coupler positioned to receive the dispersed beams, transmit a portion of the dispersed beams therethrough as the input laser beam, and reflect a second portion of the dispersed beams back toward the dispersive element. The input laser beam may be composed of multiple wavelengths. Each of the discrete beams may have a different wavelength. The second portion of the dispersed beams may propagate back to the one or more beam sources to thereby stabilize the beams to their emission wavelengths. The focusing optics may include or consist essentially of one or more cylindrical lenses, one or more spherical lenses, one or more spherical mirrors, and/or one or more cylindrical mirrors. The dispersive element may include, consist essentially of, or consist of one or more diffraction gratings (e.g., one or more transmissive gratings and/or one or more reflective gratings), one or more dispersive fibers, and/or one or more prisms.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the term "substantially" means±10%, and in some embodiments, ±5%. The term "consists essentially of" means excluding other materials that contribute to function, unless otherwise defined herein. Nonetheless, such other materials may be present, collectively or individually, in trace amounts. Herein, the terms "radiation" and "light" are utilized interchangeably unless otherwise indicated. Herein, "downstream" or "optically downstream," is utilized to indicate the relative placement of a second element that a light beam strikes after encountering a first element, the first element being "upstream," or "optically upstream" of the second element. Herein, "optical distance" between two components is the distance between two components that is actually traveled by light beams; the optical distance may be, but is not necessarily, equal to the physical distance between two components due to, e.g., reflections from mirrors or other changes in propagation direction experienced by the light traveling from one of the components to the other.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 11 is a schematic diagram of a wavelength beam combining laser system that may be utilized to supply the input beam for laser beam delivery systems in accordance with various embodiments of the invention.

DETAILED DESCRIPTION

Figure 1A:
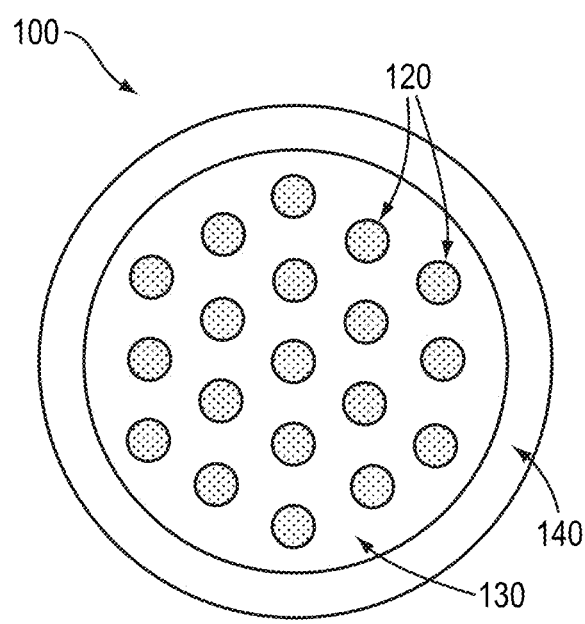
FIGS. 1A and 1B are cross-sectional schematics of example cellular-core optical fibers in accordance with various embodiments of the invention.
Figure 1B:
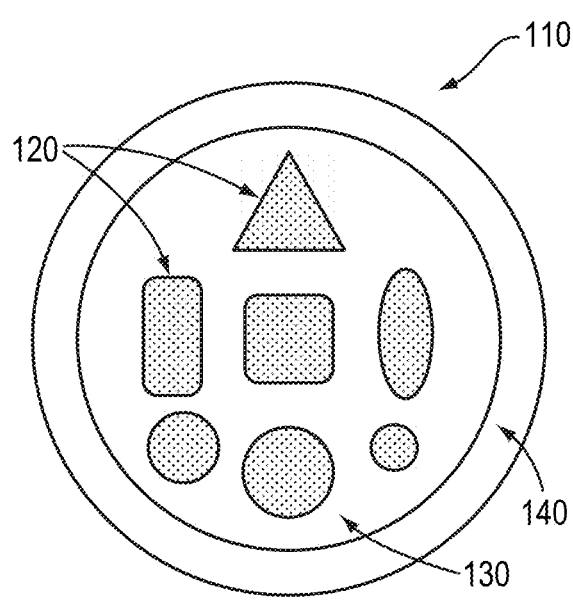

FIGS. 1A and 1B depict two different exemplary cellular-core fibers 100, 110 usable in accordance with embodiments of the present invention. As shown, each cellular-core fiber has multiple different core regions 120 each having a refractive index (e.g., a refractive index $n_0$). (While all of the core regions 120 are described in this example as having the same refractive index, embodiments of the invention include implementations in which one or more of the core regions 120 have refractive indices different from the other core regions; such indices of refraction are, in generally, greater than the refractive index of the inter-core cladding region and/or the outer cladding.) While cellular-core fibers 100, 110 are depicted as having variously shaped and numbers of core regions 120 (e.g., substantially circular in cross-section for fiber 100 and of different shapes (e.g., square, rectangular, triangular, elliptical, circular, etc.) for fiber 110), these are merely exemplary, and cellular-core fibers in accordance with embodiments of the invention may have two or more core regions 120, and the core regions 120 may have the same size and/or shape or different sizes and/or shapes. As utilized herein, a "cellular-core fiber" or "cellular-core optical fiber" has two or more distinct core regions separated from each other and at least partially surrounded by an inter-core cladding region having a refractive index lower than that of at least one of the cores. In various embodiments, the core regions of a cellular-core fiber are not coaxial; while one or more of the core regions may be annular, typically a core region does not surround one of the other core regions in the cellular-core fiber.

An inter-core cladding region 130 is disposed between the various core regions 120, and the inter-core cladding region 130 typically has an index of refraction (e.g., an index of refraction $n_1$) that is less than that of at least one (and, in various embodiments, all) of the core regions 120. The cellular-core fiber 100, 110 may also have an outer cladding region 140 that surrounds the core regions 120 and the inter-core cladding 130, and the outer cladding region 140 may have an index of refraction (e.g., an index of refraction $n_2$) that is less than or approximately equal to the index of refraction of the inter-core cladding region 130. In various embodiments, one or more additional outer cladding regions are disposed partially or completely around the outer cladding region 140, and each of the outer cladding regions may have the same or different refractive indices.

In various embodiments of the invention, the shape of an input beam is altered by rapidly steering the beam between different ones of the core regions 120 of a cellular-core fiber (e.g., fiber 100, fiber 110, or another cellular-core fiber). Movement of the input beam in different patterns (i.e., among different ones of the core regions 120) generates output beams from the optical fiber having different beam shapes. In various embodiments of the invention, the shape of the input beam may be altered by directing the beam into differently shaped core regions of the cellular-core fiber 110. The shape of the core region(s) into which the input beam is directed helps to determine the shape of the output beam emitted from the optical fiber. In various embodiments, beam energy directed into the inter-core cladding region 130 (e.g., when the beam is moved between different core regions 120) is at least partially confined in the inter-core cladding region 130, particularly in embodiments in which the index of refraction $n_2$ of the outer cladding region 140 is less than the index of refraction $n_1$ of the inter-core cladding region 130. Such beam power coupled into the inter-core cladding region 130 typically results in a non-zero background power level at the output. This background power level may vary the BPP of the final output beam, which may be desirable in various different applications of the output beam (e.g., materials processes such as cutting or welding).

Figure 2:
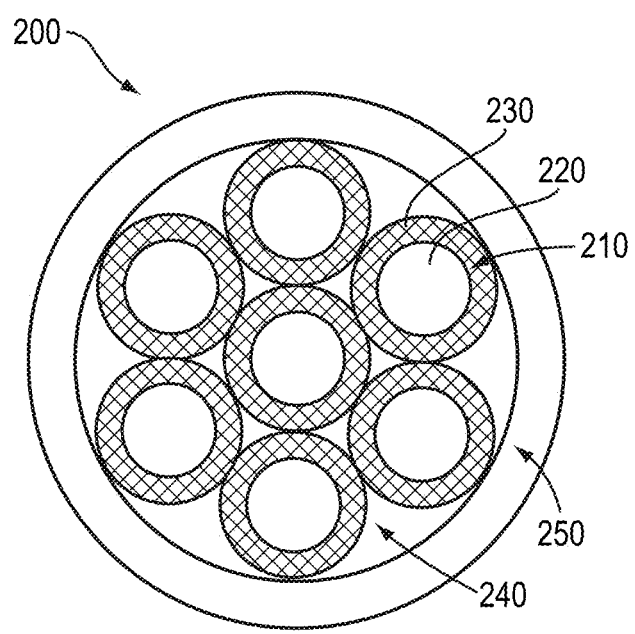
FIG. 2 is a cross-sectional schematic of an example cellular-core optical fiber in accordance with various embodiments of the invention.

FIG. 2 depicts another exemplary cellular-core fiber 200 in accordance with various embodiments of the present invention. The cellular-core fiber 200 is a fiber bundle in which multiple discrete optical fibers 210, each having at least one core region 220 surrounded by a cladding region 230, are bundled together via an "inter-core" or inter-fiber material 240 that may include, consist essentially of, or consist of a material that is at least partially transparent to light (e.g., light transmitted through the fibers 210). For example, the inter-fiber material 240 may include, consist essentially of, or consist of epoxy, glass, plastic, etc. As shown in FIG. 2, the fiber bundle 200 may be at least partially surrounded (e.g., at its outer periphery) by a ferrule 250, which may include, consist essentially of, or consist of, e.g., glass and/or metal. In various embodiments, the various individual fibers 210 of the fiber bundle 200 have different sizes and/or shapes and/or numbers of core regions 220. In various embodiments, emission of the input beam into the inter-fiber material 240 is avoided, as such beam power is typically lost (i.e., not emitted as part of the output beam from the fiber bundle 200) and may even damage the fiber bundle 200 itself. Exemplary fiber bundles and systems utilizing them are also described in U.S. patent application Ser. No. 15/807,795, filed on Nov. 9, 2017, the entire disclosure of which is incorporated by reference herein.

In various embodiments, one or more of the fibers 200 may be step-clad optical fibers as detailed in U.S. patent application Ser. No. 15/479,745, filed on Apr. 5, 2017 ("the '745 application"), the entire disclosure of which is incorporated by reference herein. As described in the '745 application, a step-clad optical fiber may include, consist essentially of, or consist of a center core, a first cladding surrounding the center core, an annular core surrounding the first cladding, and a second cladding surrounding the annular core. Various properties of the first cladding may enable BPP variation based at least in part on the power coupled into the first cladding. Other BPP and/or beam shape variations may be achieved based on power coupled into other portions of the step-clad optical fiber, either in addition to or instead of the first cladding. As described in the '745 application, the refractive index ($N_2$) of the first cladding of a step-clad fiber has a value between a high index $N_1$ (e.g., of the center core and/or of the annular core) and a low index $N_3$ (e.g., of the second cladding), so that the center core will have a smaller numerical aperture (NA), given by sqrt($N_1^2 - N_2^2$), than the NA of the annular core, given by sqrt($N_1^2 - N_3^2$). While in various embodiments the center core and an annular core of a step-clad optical fiber are approximately equal to each other, in various embodiments the index of refraction of the annular core may be different from (i.e., either less than or greater than) the index of refraction of the center core; however, in general, the index of refraction of the annular core remains larger than the index of refraction of the first cladding. In various embodiments, as disclosed in the '745 application, the annular core may have the same refractive index as the first cladding, i.e., the annular core merges into the first cladding. Step-clad fibers in accordance with embodiments of the invention may have substantially all or all of the laser power coupled into the first cladding. More power coupled into the first cladding will generally lead to larger BPP. In various embodiments, the diameter ratio of the first cladding and the center core is larger than 1.2, e.g., between 1.2 and 3, or even between 1.3 and 2.

In accordance with various embodiments of the invention, the various core, inter-core cladding, and outer cladding layers of optical fibers may include, consist essentially of, or consist of glass, such as substantially pure fused silica and/or fused silica doped with fluorine, titanium, germanium, and/or boron. Selection of proper materials to achieve the desired refractive indices in different portions of the optical fibers may be performed by those of skill in the art without undue experimentation.

Figure 3:
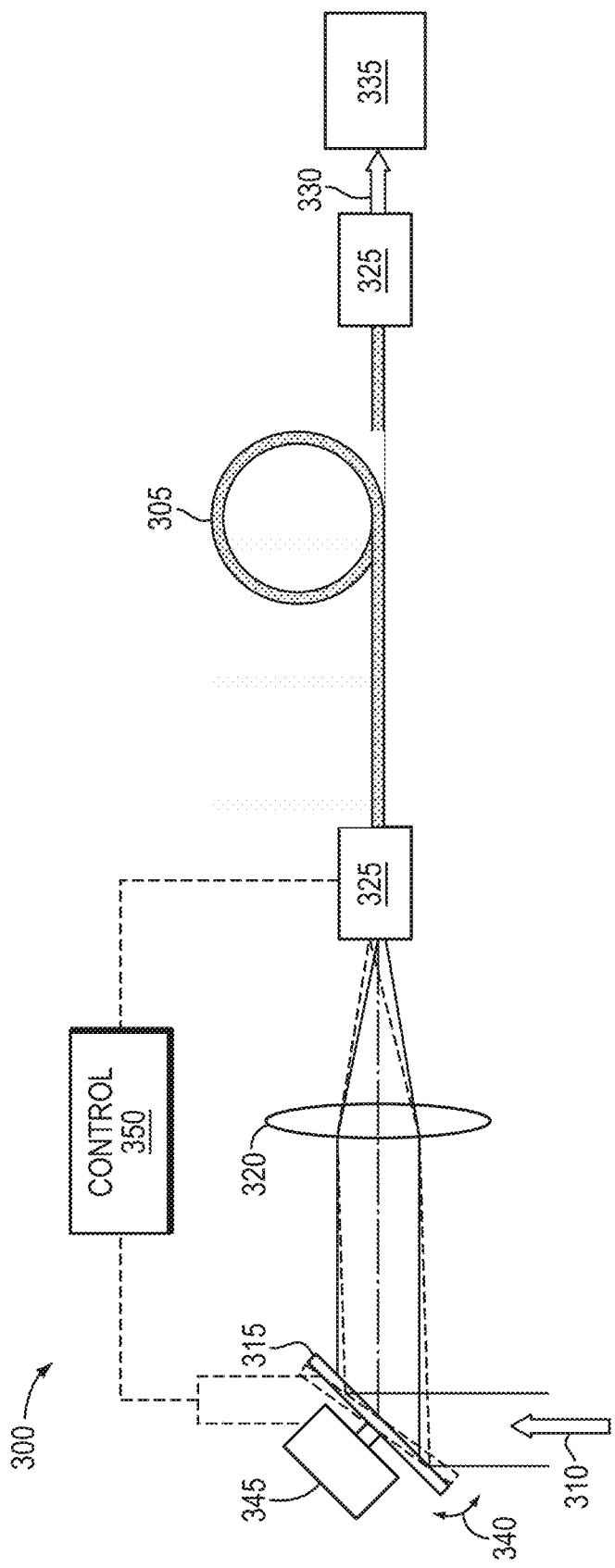
FIG. 3 is a schematic diagram of a laser system utilizing a cellular-core optical fiber in accordance with various embodiments of the invention.

FIG. 3 depicts an exemplary laser system 300 utilizing cellular-core fiber in accordance with embodiments of the invention. As shown, the laser system 300 includes a cellular-core fiber 305. A laser beam 310 is redirected by a reflector 315 (e.g., one or more mirrors) and coupled into the fiber 305 via an optical element 320. Optical element 320 may include, consist essentially of, or consist of, for example, one or more lenses (e.g., cylindrical and/or spherical lenses). As shown, one or both ends of the fiber 305 may be terminated via an end cap 325 (e.g., a glass block). One or more surfaces of one or both end caps 325, and/or of the fiber 305 (e.g., in embodiments in which one or both end caps 325 are not present) may be coated with an antireflection coating. The end caps 325 may have lengths of, e.g., at least 5 mm. The lengths of the end caps 325 may be, e.g., 50 mm or less.

The cellular-core fiber 305 alters the shape and/or BPP of the beam 310, as detailed herein, and outputs an output beam 330 into, for example, a laser head 335. The laser head 335 may include, consist essentially of, or consist of, for example, additional focusing optics and/or positioners utilized when output beam 330 is utilized for any of a host of different applications (e.g., cutting, welding, etc.). The laser beam 310 may be a multi-wavelength beam and may be generated by a WBC system, as described below; thus, in various embodiments the output beam 330 is also a multi-wavelength beam. Laser head 335 may direct the output beam to a workpiece for processing thereof. In other embodiments, the laser head 335 is omitted and the output beam is directed toward a workpiece directly from the fiber 305.

In various embodiments, movement of the reflector 315 translates the beam 310 such that it is directed into one or more of the core regions (and/or into the inter-core cladding) of the cellular-core fiber 305. For example, the reflector 315 may be tip-tilt adjusted (e.g., rotated) along a path 340 in response to one or more actuators 345. In addition or alternatively, the reflector 315 may be translated within the beam path to direct the beam 310 into different regions of the fiber 305. In various embodiments, the system may utilize a deformable reflector 315 to direct the beam, as detailed in U.S. patent application Ser. No. 14/632,283, filed on Feb. 26, 2015, the entire disclosure of which is incorporated by reference herein.

The beam 310 may be translated to different ones of the core regions (and/or to the inter-core cladding) at a beam translation speed of, e.g., greater than approximately 10 mm/s, or even greater than approximately 100 mm/s. The beam translation speed may depend on, for example, the operational speed of the actuator 345 and/or the focal length(s) of the optical element 320. As mentioned previously, during translation of the beam 310, the output power of the beam may be modulated. For example, the output power may be reduced, or even decreased to near or approximately zero power, when the beam traverses the inter-core cladding region in order to minimize in-coupling into the inter-core cladding region. In other embodiments, the output power is maintained at approximately the same level when the beam is translated from one or more core regions into the inter-core cladding, in order to in-couple more beam power into the inter-core cladding. The output power of beam 310 may also be changed (i.e., increased or decreased) when the beam is directed into different ones of the core regions of the fiber 305. In addition or instead, the amount of time the beam is directed into any particular region of the cellular-core fiber 305 (e.g., one or more of the core regions and/or the inter-core cladding region) may be varied so that the time-averaged power level coupled into such regions is different.

In various embodiments, the actuator 345 is a dual-axis actuator that is capable of tilting and/or moving the reflector 315 along two different axes (e.g., perpendicular x and y axes). In an embodiment, the mirror is turned at angles of $\theta x$ and $\theta y$, which translates the focal spot of the beam 310 on the input surface of the fiber 305 by an amount $\theta x \times f$ in the x-direction and $\theta y \times f$ in the y-direction, where the x- and y-directions are perpendicular to the direction of beam propagation and f is the focal length of the optical element 320. In other embodiments of the invention, multiple different actuators and/or multiple different reflectors may be utilized to translate the beam 310, and each actuator and/or reflector may control translation along a single axis or direction. In various embodiments, the optical element 320 may be translated in addition to or instead of the reflector 315 being moved in order to translate the beam 310 across the input surface of the fiber 305. In various embodiments, the input surface of the fiber 305 (e.g., the input end cap 325) may itself be translated in addition to or instead of the reflector 315 and/or the optical element 320 being moved in order to translate the beam 310 across the input surface of the fiber 305.

Laser systems in accordance with embodiments of the invention may incorporate a controller 350 that controls the movement of the laser beam 310 among the various core regions and/or the inter-core cladding of the cellular-core fiber 305. For example, the controller may control the movement (e.g., rotation and/or lateral movement) of reflector 315 and/or optical element 320 (e.g., via one or more actuators 345) in order to direct the laser beam 310 into different ones of the core regions and/or into the inter-core cladding. The controller 350 may also move the input end of the fiber 104, in addition to or instead of controlling reflector 315 and/or optical element 320, in order to couple the laser beam 310 into different core regions and/or into the inter-core cladding. The controller 350 may also modulate the output power of the beam 310 as a function of the position of the beam relative to the fiber 305 in order to, for example, control the amount of beam power coupled into various regions of the fiber 305. The controller 350 may also alter the speed of the relative motion between the cellular-core fiber 305 and the reflector 315 and/or optical element 320 in order to vary the amount of power coupled into various regions of the fiber 305 as a function of time.

The controller 350 may be provided as either software, hardware, or some combination thereof. For example, the system may be implemented on one or more conventional server-class computers, such as a PC having a CPU board containing one or more processors such as the Pentium or Celeron family of processors manufactured by Intel Corporation of Santa Clara, Calif., the 680×0 and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described above. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, as well as other commonly used storage devices. For embodiments in which the functions are provided as one or more software programs, the programs may be written in any of a number of high level languages such as FORTRAN, PASCAL, JAVA, C, C++, C #, BASIC, various scripting languages, and/or HTML. Additionally, the software may be implemented in an assembly language directed to the microprocessor resident on a target computer; for example, the software may be implemented in Intel 80×86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM.

The controller 350 may compute a proper position of the input laser beam relative to the fiber end face based on a desired value of a beam property (e.g., flux density, beam diameter, beam shape, BPP, etc.) at a workpiece or at the laser head 335 and a known relationship between the beam property and the position of the beam relative to the fiber end face (e.g., one or more of the core regions and/or the inter-core cladding); and/or based on user input (e.g., a commanded degree of overlap with or position on the fiber's end face or a portion thereof (e.g., one or more cores or inter-core cladding)); and/or, as explained in greater detail below, may use feedback so that the optimal alignment between the beam and the end face of the fiber is progressively attained. For example, a photodetector or other light sensor may be utilized proximate the workpiece to monitor the beam shape, beam diameter, BPP, and/or flux density at the workpiece surface (for example, the beam property of the beam itself, or via measurement of a reflection from the workpiece surface), and the controller 350 may utilize the measured value(s) as feedback to adjust the positioning of the input beam relative to the fiber end until the desired beam property is achieved at the workpiece. For example, the measured beam property may be iteratively compared to a desired beam property (e.g., one input or otherwise determined by a user, and/or one determined by one or more properties of the workpiece and/or the type of processing for which the laser is to be utilized), and the controller 350 may reduce or minimize the difference therebetween via, e.g., minimization of an error function. Other sensors may be utilized in addition or instead of light sensors in embodiments of the invention, e.g., thermal sensors and/or sensors measuring the effect of the beam on the workpiece surface (e.g., depth or profile sensors, etc.).

In various embodiments, the controller 350 may detect the beam shape and/or BPP (or other beam property) resulting from various paths traversed on the faces of various cellular-core optical fibers, store the results, and utilize the results to determine one or more suitable paths in response to a desired beam property such as beam shape or BPP. The results may even be utilized in a machine-learning model that may be utilized to predict one or more beam properties resulting from possible paths traversed by a laser beam on a given cellular-core optical fiber. In various embodiments, physical/optical modeling may be utilized to predict one or more beam properties (e.g., beam shape and/or BPP) resulting from various paths traversed on a variety of different cellular-core fibers, and such results may be utilized, at least in part, by controller 350 to select a path to achieve a desired beam property.

Figure 4A:
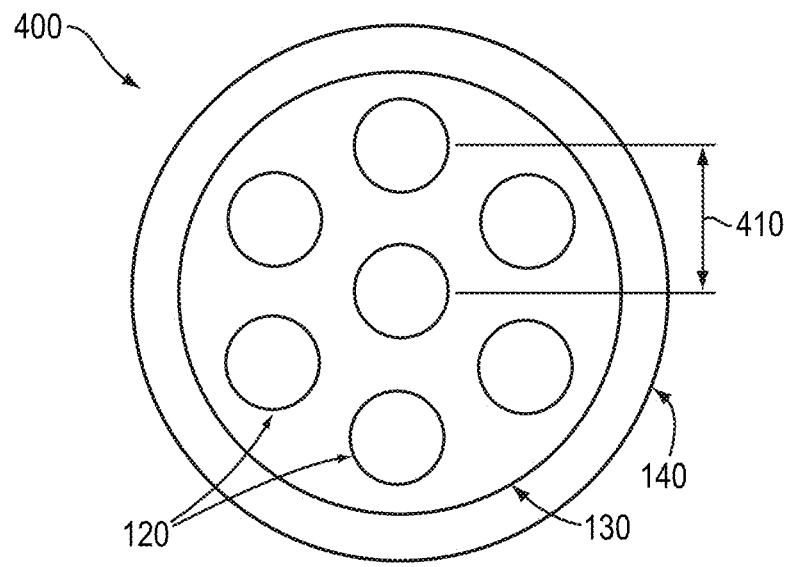
FIG. 4A is a cross-sectional schematic of an example cellular-core optical fiber in accordance with various embodiments of the invention.
Figure 4B:
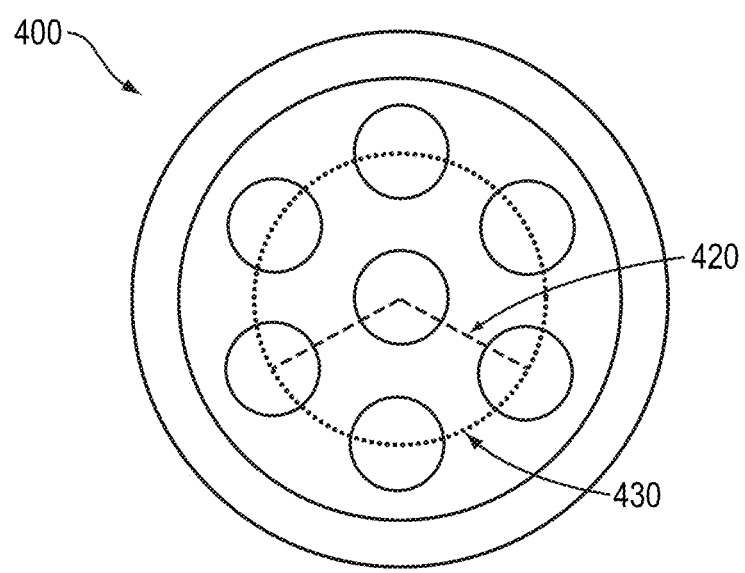
FIG. 4B depicts two different input beam paths traversable along the face of the optical fiber of FIG. 4A in accordance with various embodiments of the invention.

FIG. 4A is a schematic cross-section of an exemplary cellular-core fiber 400 in accordance with embodiments of the present invention. As shown, this example fiber 400 has seven different core regions 120 spaced apart at substantially equal distances from each other, corresponding to a core spacing 410. The core regions 120 are surrounded by an inter-core cladding 130, which is in turn enclosed by an outer cladding layer or ferrule 140. In the examples provided below, each core 120 has a diameter of 100 μm, the inter-core spacing 410 is 150 μm, the inter-core cladding 130 has a diameter of 500 μm and a numerical aperture of 0.12, and the outer cladding 140 has an outer diameter of 600 μm and a numerical aperture of 0.22. FIG. 4B depicts two different exemplary beam paths utilized to demonstrate embodiments of the present invention. The first is an "arrow" path 420 proceeding among the center core region 120 and the two core regions 120 adjacent to and slightly below the center core region 120. The second path is a "ring" path 430 proceeding among the outer six core regions 120.

Figure 5:
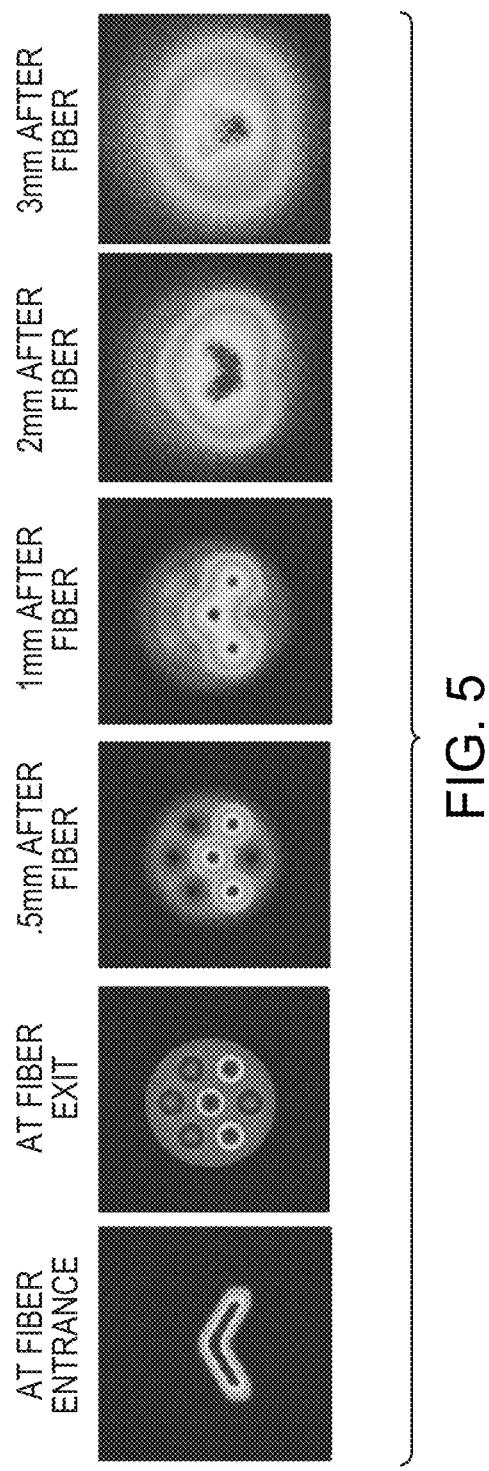
FIG. 5 depicts a series of time-averaged beam shapes of the input and output laser beams for an input beam traveling along one of the paths depicted in FIG. 4B in accordance with various embodiments of the invention.

FIG. 5 depicts a series of simulated time-averaged beam shapes of the input and output laser beams for the exemplary embodiment in which the input beam is moved along the arrow path 420 depicted in FIG. 4B. In the simulated images, the laser is a 4 kW WBC laser having a BPP of approximately 4 mm-mrad if coupled into a conventional 100 μm optical fiber. The leftmost image depicts the input beam moving along the arrow path 420, and the remaining images depict the resulting output beam at the exit surface of the fiber 400 and at increasing distances away from the fiber exit. As shown, the laser power remains substantially constant over time as the laser beam is moved from one core region 120 to another; thus, some of the laser power is coupled into the inter-core cladding region 130. This power coupled into the inter-core cladding region 130 is evident in the remaining images as a non-zero background output power level. As shown in FIG. 5, the output beam emerges from the fiber 400 as three discrete beams that merge into a single shaped beam beyond the fiber exit. In this manner, both the shape and the BPP of the input beam have been altered via control of the beam along path 420 to form the desired output beam, which may be utilized to, e.g., process a workpiece. For example, in FIG. 5 the estimated effective spot size of the beam at the fiber exit is approximately 450 μm in diameter, and the BPP of the beam at the fiber exit is approximately 18 mm-mrad.

Figure 6:
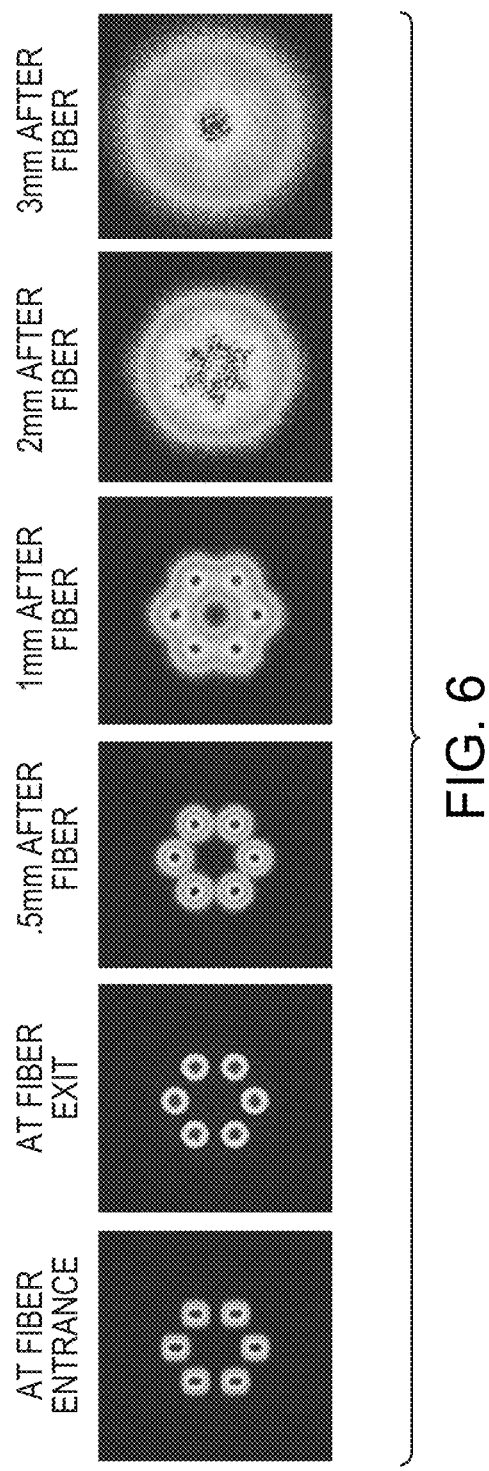
FIG. 6 depicts a series of time-averaged beam shapes of the input and output laser beams for an input beam traveling along one of the paths depicted in FIG. 4B in accordance with various embodiments of the invention.

FIG. 6 depicts a series of simulated time-averaged beam shapes of the input and output laser beams for the exemplary embodiment in which the input beam is moved along the ring path 430 depicted in FIG. 4B. In the simulated images, the laser is a 4 kW WBC laser having a BPP of approximately 4 mm-mrad if coupled into a conventional 100 μm optical fiber. The leftmost image depicts the input beam moving along the ring path 430, and the remaining images depict the resulting output beam at the exit surface of the fiber 400 and at increasing distances away from the fiber exit. As shown, the laser power is modulated at the input in order to prevent appreciable power being coupled into the inter-core cladding region 130. That is, the output power of the laser is decreased to zero as the laser beam crosses over the inter-core cladding region 130 when travelling from one core region 120 to another. As shown in FIG. 6, the output beam emerges from the fiber 400 as six discrete beams that merge into a single shaped beam beyond the fiber exit. In this manner, both the shape and the BPP of the input beam have been altered via control of the beam along path 430 to form the desired output beam, which may be utilized to, e.g., process a workpiece. For example, in FIG. 6 the estimated effective spot size of the beam at the fiber exit is approximately 365 μm in diameter, and the BPP of the beam at the fiber exit is approximately 14 mm-mrad.

Figure 7:
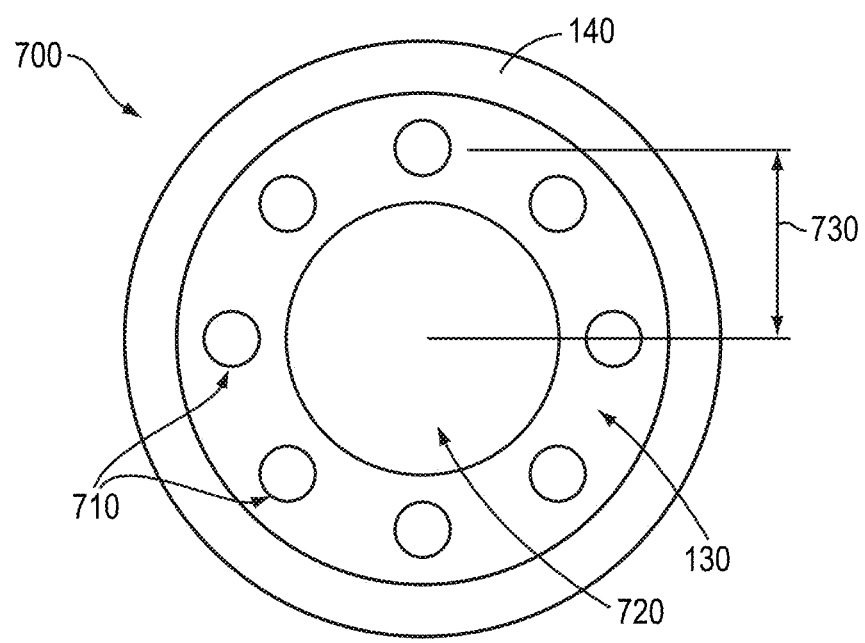
FIG. 7 is a cross-sectional schematic of an example cellular-core optical fiber in accordance with various embodiments of the invention.
Figure 8A:
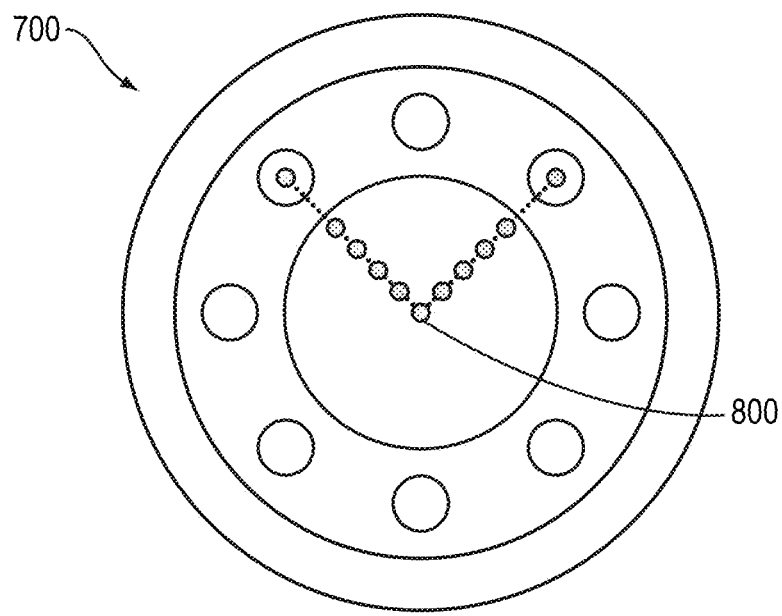
FIGS. 8A and 8B depict two different input beam paths traversable along the face of the optical fiber of FIG. 7 in accordance with various embodiments of the invention.
Figure 8B:
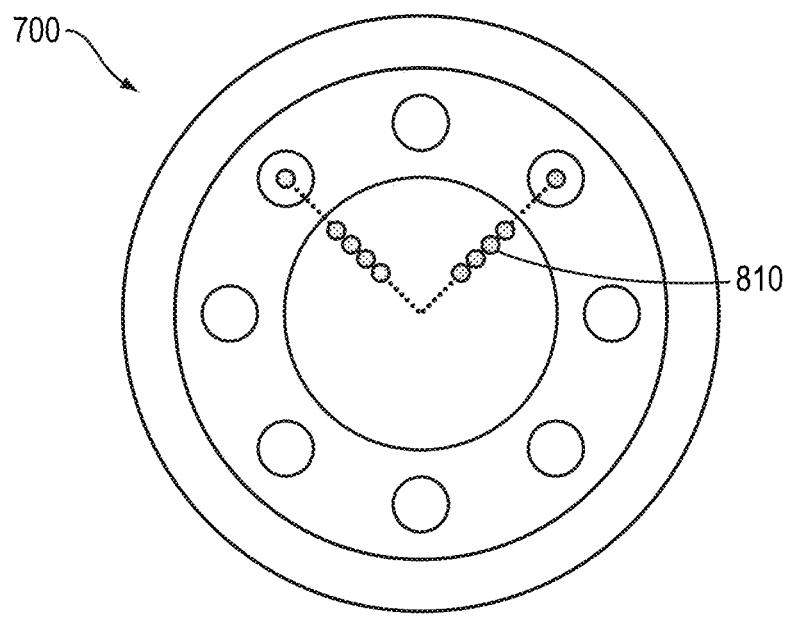

FIG. 7 is a schematic cross-section of an exemplary cellular-core fiber 700 in accordance with embodiments of the present invention. As shown, the fiber 700 has eight different outer core regions 710 that surround an inner (or center) core region 720 having a larger diameter. The core regions 710, 720 are surrounded by an inter-core cladding 130, which is in turn enclosed by an outer cladding layer 140. The center point of the inner core region 720 is separated from the center points of each of the outer core regions 710 by a spacing 730. In the examples provided below, each outer core 710 has a diameter of 100 µm, the inner core 720 has a diameter of 500 µm, the spacing 730 from the center of the inner core to any of the outer cores is 350 µm, and the inter-core cladding 130 has an outer diameter of 900 µm. FIGS. 8A and 8B depict two different exemplary beam paths utilized to demonstrate embodiments of the present invention. The first path 800, shown in FIG. 8A, is a path proceeding among the center core region 720 and two of the outer core regions 710. As shown by the dashed line, the laser power is minimized or substantially off when the beam crosses over the inter-core cladding region 130. The second path 810, shown in FIG. 8B, is similar to the path 800 of FIG. 8A except that the laser power is also reduced or minimized when the laser beam is at or near the center of the center core 720.

Figure 9:
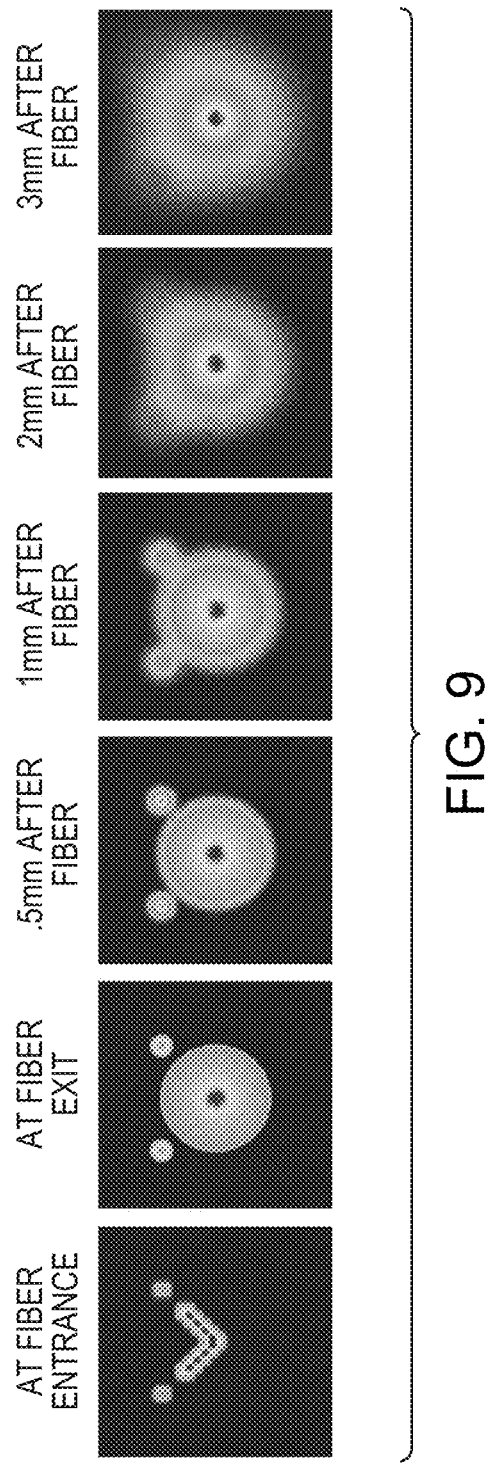
FIG. 9 depicts a series of time-averaged beam shapes of the input and output laser beams for an input beam traveling along the path depicted in FIG. 8A in accordance with various embodiments of the invention.

FIG. 9 depicts a series of simulated time-averaged beam shapes of the input and output laser beams for the exemplary embodiment in which the input beam is moved along the path 800 depicted in FIG. 8A. In the simulated images, the laser is a 4 kW WBC laser having a BPP of approximately 4 mm-mrad if coupled into a conventional 100 µm optical fiber. The leftmost image depicts the input beam moving along the path 800, and the remaining images depict the resulting output beam at the exit surface of the fiber 700 and at increasing distances away from the fiber exit. As shown, the laser power is decreased, at least on a time-averaged basis, when the input beam is coupled into the two outer core regions 710 relative to the power level coupled into the center core region 720 (i.e., the output power of the beam and/or the amount of time spent over the outer core regions 710 may be less than when the beam is directed into the center core region 720). When the output beam emerges from the fiber exit, it exits as a large primary beam accompanied by two small "pilot beams." Such pilot beams may be advantageous in applications such as welding for pre-heating areas to be processed and/or for guiding the primary beam. As shown, the primary beam has high output power at its center, and the output power decreases toward the edges of the primary beam. In FIG. 9 the estimated effective spot size of the beam at the fiber exit is approximately 490 µm in diameter, and the BPP of the beam at the fiber exit is approximately 20 mm-mrad.

Figure 10:
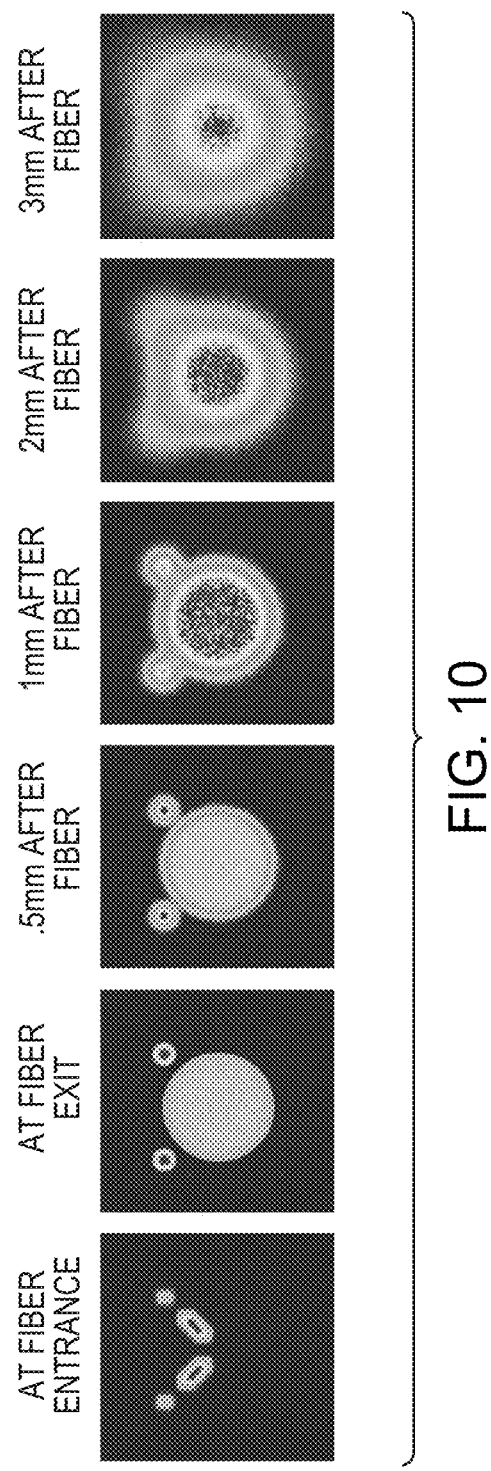
FIG. 10 depicts a series of time-averaged beam shapes of the input and output laser beams for an input beam traveling along the path depicted in FIG. 8B in accordance with various embodiments of the invention.

FIG. 10 depicts a series of simulated time-averaged beam shapes of the input and output laser beams for the exemplary embodiment in which the input beam is moved along the path 810 depicted in FIG. 8B. In the simulated images, the laser is a 4 kW WBC laser having a BPP of approximately 4 mm-mrad if coupled into a conventional 100 µm optical fiber. The leftmost image depicts the input beam moving along the path 810, and the remaining images depict the resulting output beam at the exit surface of the fiber 700 and at increasing distances away from the fiber exit. As shown, the laser power is decreased, at least on a time-averaged basis, when the input beam is coupled into the two outer core regions 710. When the output beam emerges from the fiber exit, it exits as a large primary beam accompanied by two small pilot beams. As shown, the output power of the primary beam is substantially uniform at and immediately beyond the fiber exit, i.e., the primary beam has a flat-top beam shape which may be advantageous for many applications such as welding, cladding, etc. In FIG. 10 the estimated effective spot size of the beam at the fiber exit is approximately 495 µm in diameter, and the BPP of the beam at the fiber exit is approximately 20 mm-mrad.

The controller 350 may, in accordance with the embodiments of the invention, control the BPP and/or beam shape of the output beam based on the type of desired processing (e.g., cutting, welding, etc.) and/or on one or more characteristics (e.g., materials parameters, thickness, material type, etc.) of the workpiece to be processed and/or of a desired processing path mapped out for the output beam. Such process and/or material parameters may be selected by a user from a stored database in a memory associated with controller 350 or may be entered via an input device (e.g., touchscreen, keyboard, pointing device such as a computer mouse, etc.). One or more processing paths may be provided by a user and stored in an onboard or remote memory associated with controller 350. After workpiece and/or processing path selection, the controller 350 queries the database to obtain the corresponding parameter values. The stored values may include a BPP and/or beam shape suitable to the material and/or to one or more processing paths or processing locations on the material.

As is well understood in the plotting and scanning art, the requisite relative motion between the beam and the desired beam path may be produced by, for example, optical deflection of the beam using a movable mirror, physical movement of the laser using a gantry, lead-screw or other arrangement, and/or a mechanical arrangement for moving the workpiece rather than (or in addition to) the beam. The controller 350 may, in some embodiments, receive feedback regarding the position and/or processing efficacy of the beam relative to the workpiece from a feedback unit connected to suitable monitoring sensors. In response to signals from the feedback unit, the controller 350 may alter the path, BPP and/or shape of the beam via, e.g., movement of the input beam 310 to one or more different locations on the face of the cellular-core optical fiber. Embodiments of the invention may also incorporate aspects of the apparatus and techniques disclosed in U.S. patent application Ser. No. 14/639,401, filed on Mar. 5, 2015, U.S. patent application Ser. No. 15/261,096, filed on Sep. 9, 2016, and U.S. patent application Ser. No. 15/649, 841, filed on Jul. 14, 2017, the entire disclosure of each of which is incorporated by reference herein.

In addition, the laser system may incorporate one or more systems for detecting the thickness of the workpiece and/or heights of features thereon. For example, the laser system may incorporate systems (or components thereof) for interferometric depth measurement of the workpiece, as detailed in U.S. patent application Ser. No. 14/676,070, filed on Apr. 1, 2015, the entire disclosure of which is incorporated by reference herein. Such depth or thickness information may be utilized by the controller to control the output beam BPP and/or shape to optimize the processing (e.g., cutting or welding) of the workpiece, e.g., in accordance with records in the database corresponding to the type of material being processed.

Laser systems and laser delivery systems in accordance with embodiments of the present invention and detailed herein may be utilized in and/or with WBC laser systems. Specifically, in various embodiments of the invention, multi-wavelength output beams of WBC laser systems may be utilized as the input beams for laser beam delivery systems for variation of BPP and/or beam shape as detailed herein. FIG. 11 depicts an exemplary WBC laser system 1100 that utilizes one or more lasers 1105. In the example of FIG. 11, laser 1105 features a diode bar having four beam emitters emitting beams 1110 (see magnified input view 1115), but embodiments of the invention may utilize diode bars emitting any number of individual beams or two-dimensional arrays or stacks of diodes or diode bars. In view 1115, each beam 1110 is indicated by a line, where the length or longer dimension of the line represents the slow diverging dimension of the beam, and the height or shorter dimension represents the fast diverging dimension. A collimation optic 1120 may be used to collimate each beam 1110 along the fast dimension. Transform optic(s) 1125, which may include, consist essentially of, or consist of one or more cylindrical or spherical lenses and/or mirrors, are used to combine each beam 1110 along a WBC direction 1130. The transform optics 1125 then overlap the combined beam onto a dispersive element 1135 (which may include, consist essentially of, or consist of, e.g., a reflective or transmissive diffraction grating, a dispersive prism, a grism (prism/grating), a transmission grating, or an Echelle grating), and the combined beam is then transmitted as single output profile onto an output coupler 1140. The output coupler 1140 then transmits the combined beams 1145 as shown on the output front view 1150. The output coupler 1140 is typically partially reflective and acts as a common front facet for all the laser elements in this external cavity system 1100. An external cavity is a lasing system where the secondary mirror is displaced at a distance away from the emission aperture or facet of each laser emitter. In some embodiments, additional optics are placed between the emission aperture or facet and the output coupler or partially reflective surface. The output beam 1145 is a thus a multiple-wavelength beam (combining the wavelengths of the individual beams 1110), and may be utilized as the input beam in laser beam delivery systems detailed herein and/or may be coupled into an optical fiber.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of forming a laser beam, the method comprising:
    providing a cellular-core optical fiber having an input end and an output end opposite the input end, the cellular-core optical fiber comprising (i) a plurality of core regions, (ii) an inter-core cladding region surrounding and extending between the core regions, and (iii) an outer cladding surrounding the inter-core cladding region, wherein a refractive index of each of the core regions is larger than a refractive index of the inter-core cladding region; and
    directing an input laser beam across the input end of the cellular-core optical fiber along a path comprising one or more of the core regions, whereby at least one of a beam shape or a beam parameter product of an output beam emitted at the output end of the cellular-core optical fiber is determined at least in part by the path of the input laser beam.

2. The method of claim 1, further comprising modulating an output power of the input laser beam as the input laser beam is directed along the path.

3. The method of claim 1, wherein the path comprises a portion of the inter-core cladding region.

4. The method of claim 3, further comprising reducing an output power of the input laser beam as the input laser beam is directed over the inter-core cladding region, thereby reducing or substantially eliminating coupling of beam energy into the inter-core cladding region.

5. The method of claim 3, wherein beam energy coupled into the inter-core cladding region contributes a non-zero background energy level to the output beam.

6. The method of claim 1, wherein the refractive index of the inter-core cladding region is greater than a refractive index of the outer cladding.

7. The method of claim 1, wherein the refractive index of the inter-core cladding region is approximately equal to a refractive index of the outer cladding.

8. The method of claim 1, wherein at least two of the core regions of the cellular-core optical fiber have different cross-sectional shapes in a plane perpendicular to a central axis of the cellular-core optical fiber.

9. The method of claim 1, wherein all of the core regions of the cellular-core optical fiber have the same cross-sectional shape.

10. The method of claim 1, wherein the plurality of core regions of the cellular-core optical fiber comprises (i) a central core region and (ii) a plurality of outer core regions disposed around the central core region.

11. The method of claim 10, wherein a diameter of the central core region is greater than a diameter of at least one of the outer core regions.

12. The method of claim 1, wherein none of the core regions is annular in cross-section.

13. The method of claim 1, wherein the core regions are not coaxial with respect to each other.

14. The method of claim 1, wherein the path is selected based at least in part on a beam parameter sensed proximate the output end of the cellular-core optical fiber.

15. The method of claim 1, wherein the plurality of core regions, the inter-core cladding region, and the outer cladding all extend along an entirety of a length of the cellular-core optical fiber.

16. The method of claim 1, further comprising processing, with the output beam, a workpiece disposed proximate the output end of the cellular-core optical fiber.

17. The method of claim 16, wherein the at least one of the beam parameter product or the beam shape of the output laser beam is determined, via selection of the path, based at least in part of a characteristic of the workpiece.

18. The method of claim 17, wherein the characteristic of the workpiece comprises at least one of a thickness of the workpiece or a composition of the workpiece.

19. A method of forming a laser beam, the method comprising:
    providing a cellular-core optical fiber having an input end and an output end opposite the input end, the cellular-core optical fiber comprising (i) a plurality of core regions, (ii) an inter-core cladding region surrounding and extending between the core regions, and (iii) an outer cladding surrounding the inter-core cladding region, wherein a refractive index of each of the core regions is larger than a refractive index of the inter-core cladding region; and
    directing an input laser beam into one or more of the core regions and into the inter-core cladding region, whereby at least one of a beam shape or a beam parameter product of an output beam emitted at the output end of the cellular-core optical fiber is determined at least in part by the one or more core regions into which the input laser beam is directed.

20. The method of claim 19, wherein, in a plane perpendicular to a central axis of the cellular-core optical fiber, at least two of the core regions of the cellular-core optical fiber have different cross-sectional shapes and/or different cross-sectional sizes.

21. The method of claim 19, further comprising processing, with the output beam, a workpiece disposed proximate the output end of the cellular-core optical fiber.

22. The method of claim 21, wherein the at least one of the beam parameter product or the beam shape of the output laser beam is determined, via selection of the one or more core regions into which the input laser beam is directed, based at least in part of a characteristic of the workpiece.

23. The method of claim 22, wherein the characteristic of the workpiece comprises at least one of a thickness of the workpiece or a composition of the workpiece.

24. A method of forming a laser beam, the method comprising:
   providing a cellular-core optical fiber having an input end and an output end opposite the input end, the cellular-core optical fiber comprising (i) a plurality of core regions, (ii) an inter-core cladding region surrounding and extending between the core regions, and (iii) an outer cladding surrounding the inter-core cladding region, wherein a refractive index of each of the core regions is larger than a refractive index of the inter-core cladding region; and
   directing an input laser beam into only one of the core regions while not directing any laser light into any of the other core regions, and, optionally, directing the input laser beam into the inter-core cladding region, whereby at least one of a beam shape or a beam parameter product of an output beam emitted at the output end of the cellular-core optical fiber is determined at least in part by the single core region into which the input laser beam is directed.

25. The method of claim 24, wherein the input laser beam is directed into the one of the core regions and into the inter-core cladding region.

26. The method of claim 24, further comprising processing, with the output beam, a workpiece disposed proximate the output end of the cellular-core optical fiber.

27. The method of claim 26, wherein the at least one of the beam parameter product or the beam shape of the output laser beam is determined, via selection of the single core region into which the input laser beam is directed, based at least in part of a characteristic of the workpiece.

28. The method of claim 27, wherein the characteristic of the workpiece comprises at least one of a thickness of the workpiece or a composition of the workpiece.

* * * * *